United States Patent
Klinkert et al.

(10) Patent No.: US 7,721,537 B2
(45) Date of Patent: May 25, 2010

(54) EXHAUST ASSEMBLY

(75) Inventors: Deborah A. Klinkert, Plymouth, MN (US); Douglas L. Hanson, Blaine, MN (US)

(73) Assignee: Cummins Power Generation Inc., Minneapolis, MN (US)

( * ) Notice: Subject to any disclaimer, the term of this patent is extended or adjusted under 35 U.S.C. 154(b) by 0 days.

(21) Appl. No.: 10/765,708

(22) Filed: Jan. 27, 2004

(65) Prior Publication Data

US 2005/0161281 A1    Jul. 28, 2005

(51) Int. Cl.
 *F02B 27/02*  (2006.01)
(52) U.S. Cl. .......................................... 60/312; 60/310
(58) Field of Classification Search .................. 60/310, 60/312; 181/227, 196, 204
See application file for complete search history.

(56) References Cited

U.S. PATENT DOCUMENTS

| | | | |
|---|---|---|---|
| 1,530,324 A * | 3/1925 | Pribil | 181/279 |
| 3,111,190 A * | 11/1963 | Vaughn | 181/260 |
| 3,834,341 A | 9/1974 | Sexton et al. | 115/5 R |
| 4,167,987 A | 9/1979 | Turner | 181/235 |
| 4,744,440 A | 5/1988 | Hanson | 181/227 |
| 4,867,269 A * | 9/1989 | Lalikos et al. | 181/207 |
| 5,147,232 A | 9/1992 | Miles et al. | 440/89 |
| 5,162,622 A | 11/1992 | Malmsten | 181/227 |
| 5,639,127 A * | 6/1997 | Davey | 285/49 |
| 5,670,757 A | 9/1997 | Harris | 181/264 |
| 5,703,338 A | 12/1997 | Liese | 181/264 |
| 5,894,115 A | 4/1999 | Weiner | 181/272 |
| 6,058,702 A * | 5/2000 | Alexnat et al. | 60/322 |
| 6,408,625 B1 * | 6/2002 | Woon et al. | 60/608 |
| 6,591,939 B2 * | 7/2003 | Smullin et al. | 181/260 |
| 6,843,516 B2 * | 1/2005 | Bishop et al. | 285/420 |
| 2004/0050618 A1* | 3/2004 | Marocco | 181/248 |

* cited by examiner

*Primary Examiner*—Thomas E. Denion
*Assistant Examiner*—Diem Tran
(74) *Attorney, Agent, or Firm*—Hamre, Schumann, Mueller & Larson, P.C.; J. Bruce Schelkopf

(57) ABSTRACT

A system includes a combustion engine for a genset. The engine having an exhaust to emit water and exhaust gases from the exhaust and a sound-dampening device coupled between the exhaust and a muffler, the sound-dampening device including a tubular member having internal rings.

26 Claims, 6 Drawing Sheets

EXHAUST ASSEMBLY

FIELD

This invention relates to the field of exhaust assemblies, and more specifically to exhaust assemblies for marine engine applications.

BACKGROUND

In marine exhaust systems, a flexible exhaust hose is coupled between the combustion engine of a generator set (genset) and a muffler and water separator. These flexible exhaust hoses transfer the exhaust gases and the raw water from the genset to the boat muffler and water separator that are located remote from the genset. Unlike automotive exhaust system that are made of metal, which is a good noise barrier, marine exhaust hoses have to be flexible and thus are not good barriers for noise. Lately, genset noise has been reduced through better designs, thus making the radiated noise from the exhaust hose the major source of overall noise.

One technique to reduce the noise of exhaust hoses is to insulate the exhaust hose with a barrier type material. However, this is not a practical solution since the boat builder supplies the exhaust hose and the builders are typically reluctant to invest the additional time and money to insulate the exhaust hose. What is needed is a more practical technique to reduce marine exhaust hose noise.

SUMMARY

A system includes a combustion engine having an exhaust to emit water and exhaust gases from the exhaust and a sound-dampening device coupled between the exhaust and a muffler. The sound-dampening device includes a tubular member having two or more internal rings.

In one option, the tubular member includes a flexible exhaust hose for coupling between the exhaust and the muffler, the flexible exhaust hose having an inner diameter, and the two or more rings are located on the inner diameter of the flexible exhaust hose, each ring having an outer diameter the same as the inner diameter of the flexible exhaust hose and an inner diameter smaller than the inner diameter of the flexible exhaust hose.

In one option, the tubular member includes a rigid tube having a first end connectable to the exhaust and a second end couplable to a flexible exhaust hose. The tube includes an inner diameter, the inner diameter having the at least two rings mounted thereto, each ring having an outer diameter the same as the inner diameter of the tube and an inner diameter smaller than the inner diameter of the tube.

DETAILED DESCRIPTION

The following detailed description and accompanying drawings show various embodiments according to the inventive subject matter disclosed herein. These embodiments are described in sufficient detail to enable those skilled in the art to practice the invention. Other embodiments may be utilized and structural changes may be made without departing from the scope of the present invention.

Figure 1:
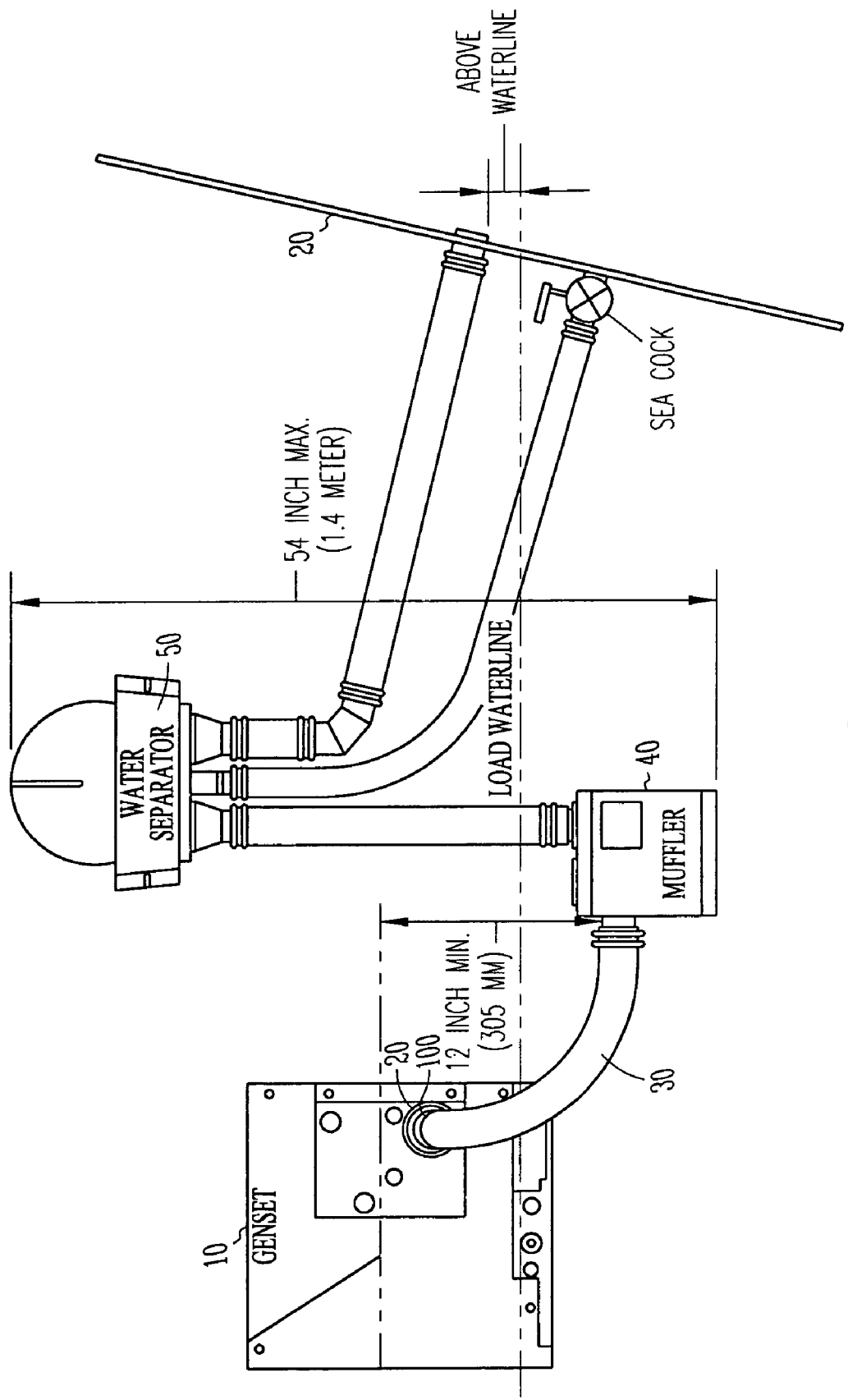
FIG. 1 shows a schematic view of a marine genset exhaust system in accordance with one embodiment.

FIG. 1 shows a schematic view of a of a marine genset exhaust system in accordance with one embodiment. The figure shows a layout including a genset 10 having an exhaust portion 20, a flexible marine exhaust hose 30, a muffler 40, and a water separator 50. The components are shown within a boat 2. The boat builder supplies and installs the genset and the exhaust system for the genset in boat 2. Genset 10 includes a combustion engine which produces and controls electricity to be used on the boat. In this example, an exhaust tube 100 is coupled between the exhaust portion 20 and the flexible marine exhaust hose 30. Exhaust gases and water from genset 10 are emitted from the genset through exhaust portion 20, into hose 30, and through muffler 40 and on to water separator 50.

Figure 2:
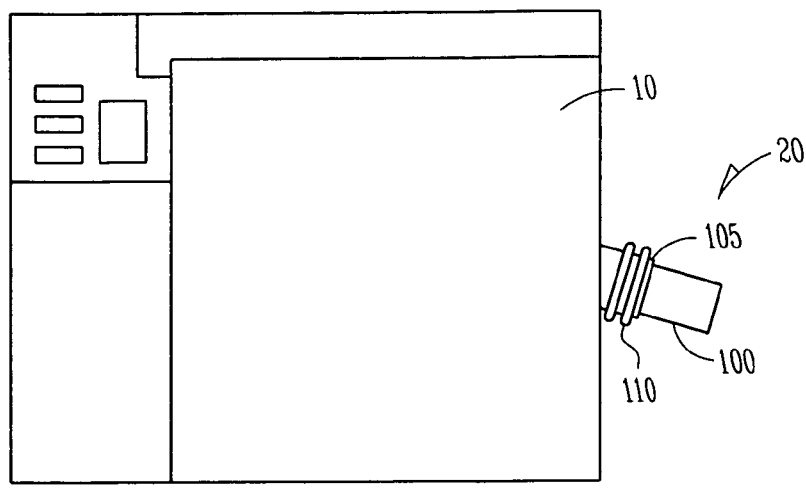
FIG. 2 shows a side view of a genset having an exhaust assembly in accordance with one embodiment.

FIG. 2 shows a side view of genset 10. Exhaust portion 20 includes an elbow 105 having exhaust tube 100 mounted thereto by O-clamps 105. Exhaust tube 100 is a sound-dampening device that reduces the radiation of sound from standard marine hose 30 (FIG. 1). The exhaust tube 100 does not affect the outer dimensions of the genset 10. In other words, a genset without tube 100 includes an exhaust portion that takes up the space of tube 100. Thus, the boat builder does not have to do any additional work or invest time and money in modifying the exhaust.

Figure 3:
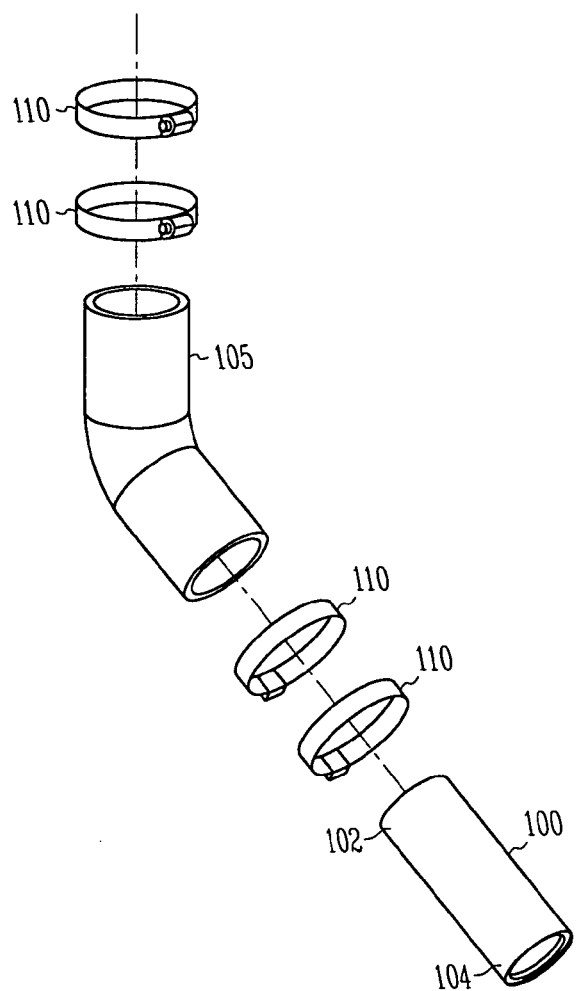
FIG. 3 shows an exploded view of the exhaust assembly of FIG. 2.
Figure 5:
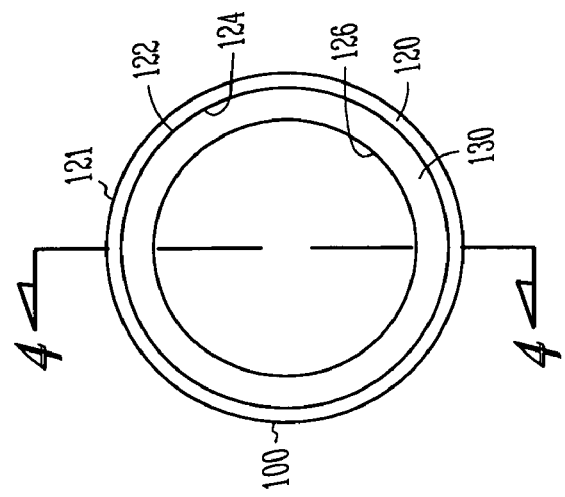
FIG. 5 shows an end view of the exhaust tube of FIG. 4.
Figure 4:
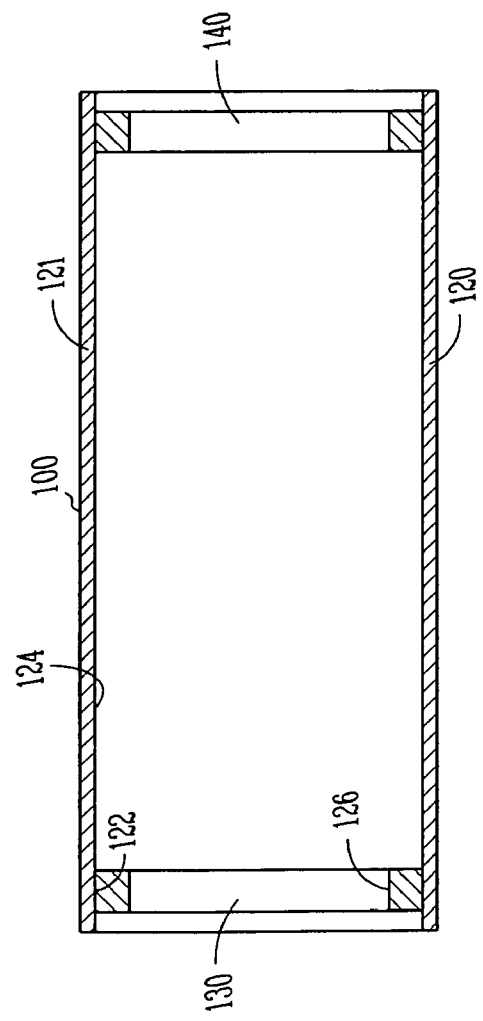
FIG. 4 shows a section view of an exhaust tube of FIG. 2.

FIGS. 3-5 show further details of exhaust tube 100. FIG. 3 shows an exploded view of portions of the exhaust assembly of FIG. 2. FIG. 4 shows a section view of exhaust tube 100. FIG. 5 shows an end view of exhaust tube 100. Sound-dampening exhaust tube 100 includes a rigid tubular body having a first end 102 connectable to the exhaust elbow 105 and a second end 104 connectable to a standard flexible exhaust hose such as hose 30 (FIG. 1). Tube 100 includes an inner diameter 124. Inner diameter 124 includes at least two constricting members such as rings 130, 140 mounted thereto, each ring 130, 140 having an outer diameter 122 the same as the inner diameter 124 of the tube 100 and an inner diameter 126 smaller than the inner diameter 124 of the tube. In one embodiment, the respective rings are at opposite ends of tube 100 and are about 4 inches to 5 inches apart.

In one example, exhaust tube 100 is a two-inch diameter and five-inch long rigid metal pipe, such as a stainless steel tube. Rings 134, 140 can also be formed of stainless steel. The specific diameter and length of the rings 130, 140 and tube 100 can vary. The rings 130, 240 can be welded to the tube body 121.

Exhaust tube 100 reduces radiated noise from exhaust hose 30. Rings 130 and 140 provide a constriction as the water and exhaust gases leave the combustion engine of genset 10. The rings help form the water into water droplets and mix the gas with the water so as to reduce noise generated by the combustion engines. The constriction provided by rings 130, 140 also increases the velocity of the exhaust gas to more effectively pick up drops of water from the bottom of the tube 100 and hose 30 and to be able to carry the water with the gas.

Moreover, these water droplets can help absorb sound. Also, the droplets help cool the exhaust gas. Cooler gases have shorter sound waves which are easier to attenuate. Moreover, the rings themselves restrict the sound-dampening device which increases attenuation. These factors, among others, provide for the sound dampening properties provided by exhaust tube 100.

Figure 9:
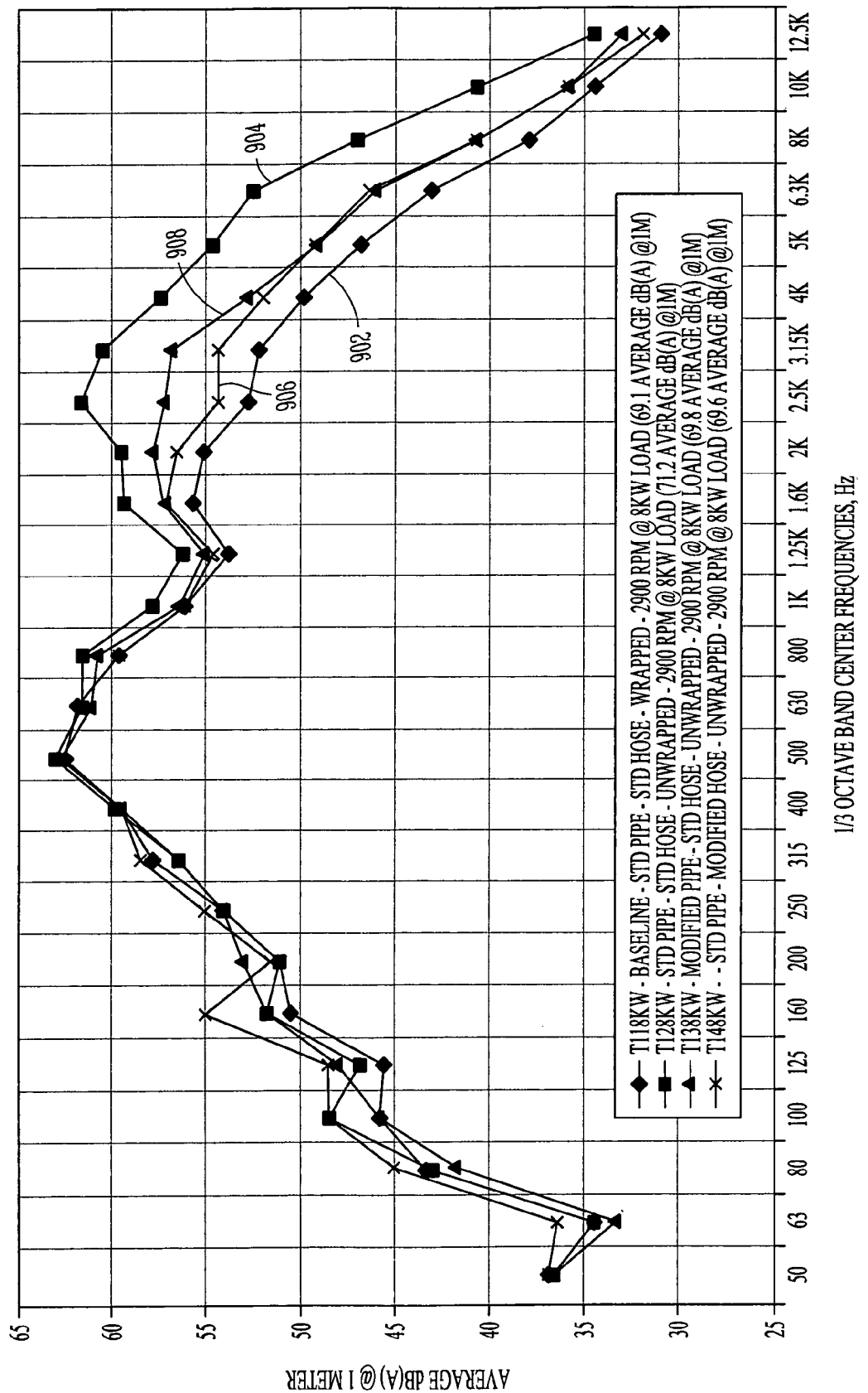
FIG. 9 shows a graph depicting exhaust system noise tests.
Figure 10:
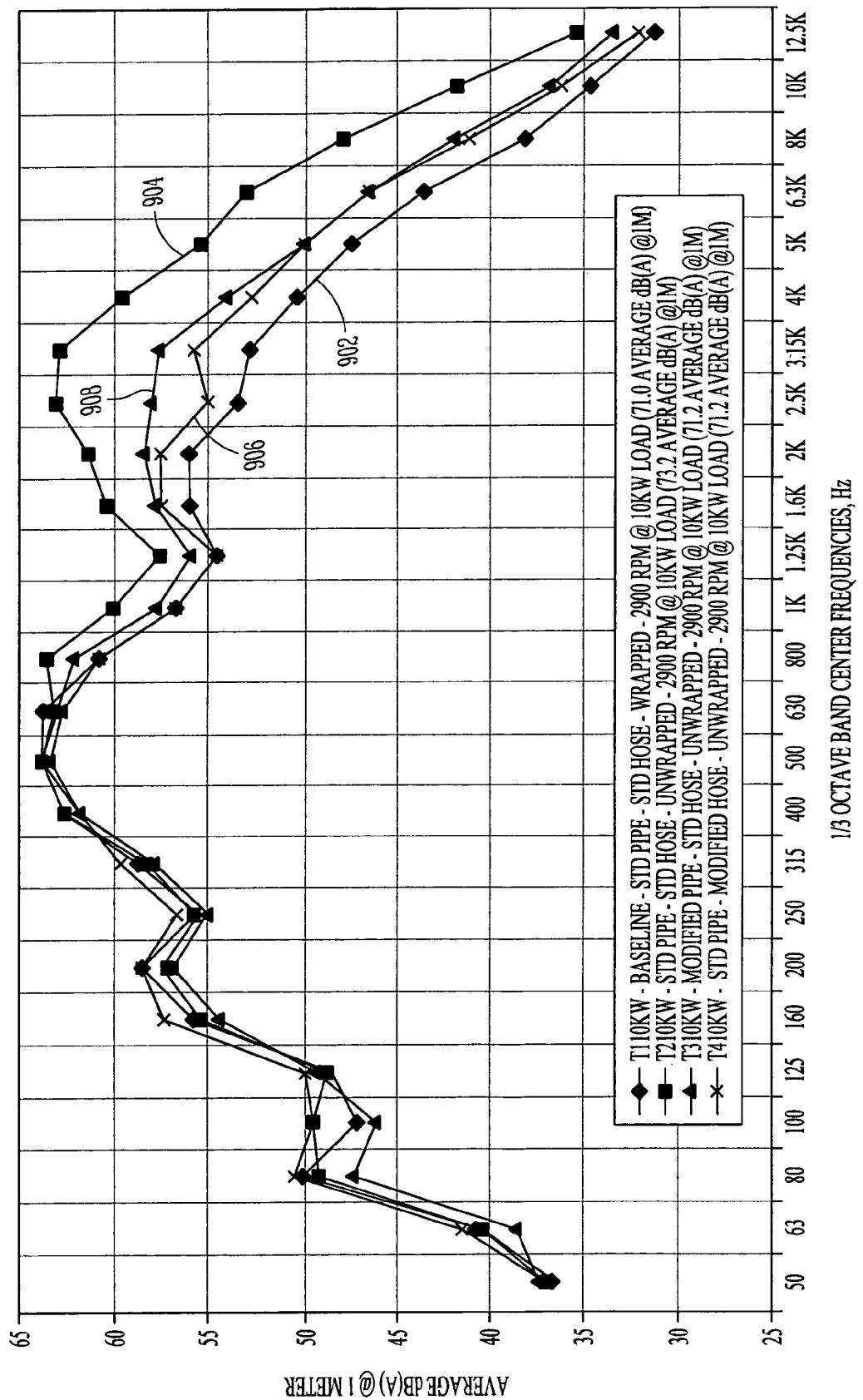
FIG. 10 shows another graph depicting exhaust system noise tests.

Again, the exhaust assembly of FIGS. 2-5 includes an exhaust tube 100 that is installed directly to the exhaust of the genset 10. A standard flexible, marine exhaust hose 30 (FIG. 1) can be installed between exhaust tube 100 and muffler 40. As can be seen in FIGS. 9-10, which will be discussed in detail below, when the exhaust tube 100 is installed, the radiated exhaust noise from the industry standard hose 30 is reduced almost to the level of an exhaust hose wrapped in a lead sheet and one-inch fiberglass. Thus, the radiated noise from the hose is no longer a major overall noise issue. Moreover, as noted above the tube 100 does not change the overall appearance of the genset and can be installed by the genset manufacturer. Thus, the boat builder does not have to do any additional work or invest time and money in modifying the exhaust.

Figure 6:
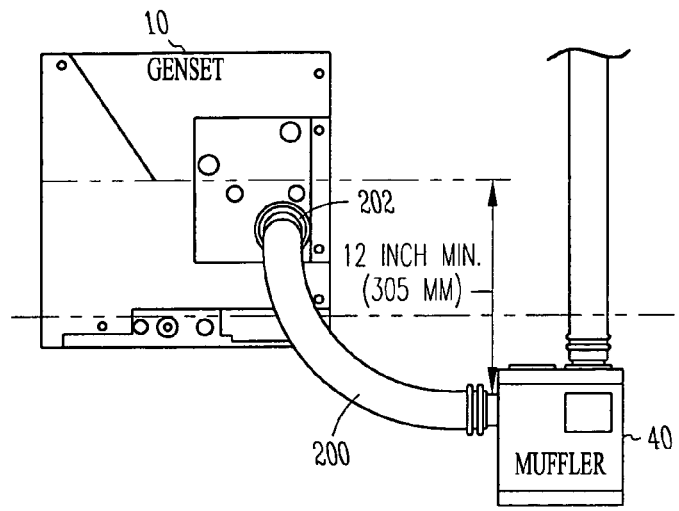
FIG. 6 shows a genset having an exhaust assembly in accordance with one embodiment.
Figure 7:
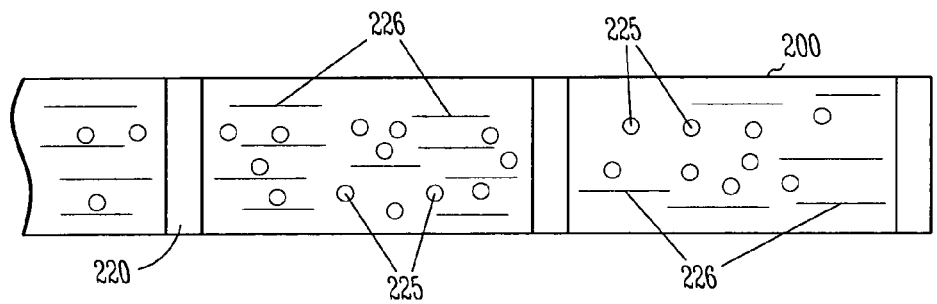
FIG. 7 shows a side view of an exhaust hose in accordance with one embodiment.
Figure 8:
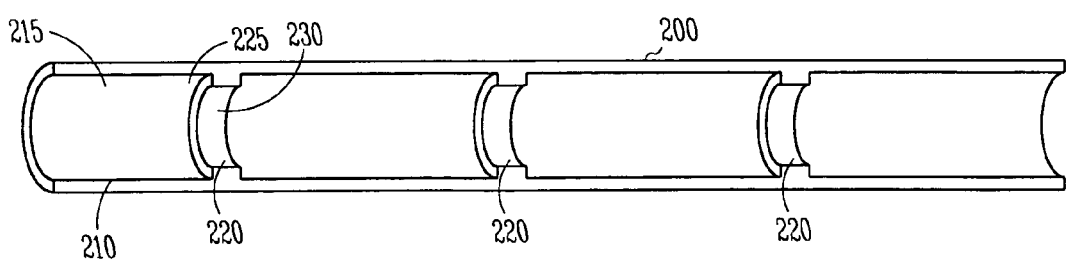
FIG. 8 shows a section view of the exhaust hose of FIG. 7.

FIGS. 6-8 show an exhaust assembly according to one embodiment. The exhaust assembly of FIGS. 6-8 includes a modified flexible exhaust hose 200. In one embodiment, genset 10 of FIG. 6 does not include an exhaust tube 100 as described above. Instead, flexible hose 200 is coupled to a standard genset exhaust 202. In this example, the sound-dampening device of the system includes flexible exhaust hose 200 connected between the genset exhaust and muffler 40.

As shown in FIGS. 7 and 8, flexible exhaust hose 200 includes a tubular hose body 210 with internal spaced rings 220. In one example, rings 220 are mounted to an inner diameter surface 215 of the hose body 210 and are evenly spaced about 4½ inches apart throughout the length of the hose (which can be about 6 feet or less). In other embodiments, the rings can be spaced between four and five inches apart. The rings 220 have an outer diameter 225 the same size as the inner diameter 215 of hose body 210. Rings 220 have an inner diameter smaller than the inner diameter 215 of hose body 210. For example, the inner diameter of hose body 210 can be about 2 inches and the inner diameter of the rings 220 can be about 1 to 1½ inches.

FIG. 7 shows a side view of exhaust hose 200 in accordance with one embodiment. FIG. 8 shows a section view of the exhaust hose. Rings 220 are adapted to change the exhaust gas flow and mixing it with water so as to reduce noise generated by the combustion engine. Rings 220 provide a constriction as the water and exhaust gases leave the combustion engine of genset 10. The rings help form the water into water droplets and mix the gas with the water so as to reduce noise generated by the combustion engines. Without the rings the water would mostly stay on the bottom of the hose. The constriction provided by rings 220 also increases the velocity of the exhaust gas to more effectively pick up drops of water from the bottom of the hose and to be able to carry the water with the gas. Moreover, these water droplets can help absorb sound. Also, the droplets help cool the exhaust gas. Cooler gases have shorter sound waves which are easier to attenuate. Moreover, the rings themselves restrict the sound-dampening device which increases attenuation. These factors, among others, provide for the sound dampening properties provided by exhaust hose 200.

Exhaust hose 200 that can be used by a boat builder instead of the industry standard exhaust hose to reduce the exhaust noise radiated from the hose. As can be seen in FIGS. 9-10, when the hose 200 is installed, the noise level is reduced almost to the level of that of a flexible exhaust hose wrapped in a lead sheet and 1-inch fiberglass. The radiated exhaust noise from this modified flexible hose is no longer a major noise source and the overall noise level of the genset is reduced. The example hose 200 is interchangeable with industry standard hoses (for example, an outer diameter of about 2 inches and a length of usually 6 feet or less). The hose 200 can be used on almost any manufacturer or model genset.

FIGS. 9 and 10 show graphs depicting exhaust system noise tests for the exhaust tube 100 and the exhaust hose 200 discussed above. The graphs display one meter A-weighted four-side average sound pressure level frequency spectrums of a gasoline marine genset with different external exhaust system configurations. The frequency spectrums in FIG. 9 have the genset load at 8 kW and the frequency spectrums in FIG. 10 have the genset loads at 10 kW. All the tested exhaust configurations include a two-inch diameter, six-foot flexible exhaust hose, water lift muffler, water separator, and infinite open tube exhaust. The baseline frequency spectrum 902 (diamonds) has a typical flexible exhaust hose wrapped in lead and fiberglass. The frequency spectrum 904 (squares) has an unwrapped standard flexible exhaust hose. The frequency spectrum 906 (cross-marks) uses a three-foot length of flexible exhaust hose with internal rings every 5 inches and a three-foot length of standard flexible hose in series. The frequency spectrum 908 (triangles) has an unwrapped typical exhaust hose and an exhaust tube 100 with internal rings such as installed in FIG. 2.

The radiated exhaust noise from the industry standard flexible exhaust hose is predominant in the frequency range of 1 kHz and above. Comparing the frequency spectrums of the different configurations, it can be seen that the radiated exhaust noise from the flexible exhaust hose in the frequency region of 1 kHz and above is significantly reduced when the standard flexible exhaust hose is wrapped or when the flexible exhaust hose with rings is installed or when the exhaust tube with rings is installed. This reduction would be even more dramatic if the frequency spectrum of only the exhaust side of the genset were compared instead of the average of four sides as shown here. The reduction would also be more dramatic if the frequency spectrum was linear not A-weighted as shown. The A-weighting reduces the noise contribution of frequencies above 2 kHz. A linear frequency scale better represents the noise quality improvement due to installing the modified exhaust hose and the modified exhaust tube.

In further embodiments, the exhaust components discussed herein can be used on any marine combustion engine to reduce the radiated exhaust noise from a flexible marine exhaust hose.

The above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. An exhaust assembly for a marine genset, the exhaust assembly comprising:
   an exhaust manifold configured to emit cooling water and exhaust gases from a combustion engine; and
   a sound-dampening device configured to be coupled between the exhaust manifold and a muffler, the sound-dampening device including a tubular member having an inner diameter and two or more distinct rings located on the inner diameter of the tubular member; each of the rings having surfaces positioned substantially perpendicular to a flow of the cooling water and exhaust gases; each of the rings having a generally circular inner surface exposed directly to an exhaust gas passageway in the tubular member, the inner surface of each of the rings having a substantially uniform inner diameter which defines an opening therethrough, wherein the opening is unobstructed, the rings constricting the passageway which causes mixing of the cooling water with the exhaust gases to reduce noise generated by the combustion engine.

2. The exhaust assembly of claim 1, wherein the two or more rings located on the inner diameter of the tubular member, comprises two rings located at opposite ends of the tubular member.

3. The exhaust assembly of claim 1, wherein each ring is in a plane perpendicular to the length of the tubular member.

4. The exhaust assembly of claim 1, wherein each ring located on the inner diameter of the tubular member is a closed ring.

5. The exhaust assembly of claim 1, wherein each ring has an uninterrupted inner diameter.

6. The exhaust assembly of claim 1, wherein the inner diameter of each of the rings is sized to be 25% to 50% smaller than the inner diameter of the tubular member to provide constriction of the exhaust gas passageway.

7. The exhaust assembly of claim 1, wherein the tubular member is flexible and is configured to be connected between the exhaust manifold and directly to the muffler, each ring having an outer diameter the same as the inner diameter of the tubular member and an inner diameter smaller than the inner diameter of the tubular member.

8. The exhaust assembly of claim 7, wherein the two or more rings are evenly spaced about 4½ inches apart from each other along a length of the flexible tubular member.

9. The exhaust assembly of claim 1, wherein the tubular member is rigid and is connectable between the exhaust manifold and an exhaust hose connected to the muffler, each ring having an outer diameter the same as the inner diameter of the tubular member and an inner diameter smaller than the inner diameter of the tubular member.

10. The exhaust assembly of claim 9, wherein the rigid tubular member includes a first ring mounted to the first end of the rigid tubular member and a second ring mounted to a second end of the rigid tubular member, the first ring and the second ring being 4 to 5 inches apart.

11. An exhaust apparatus for a marine genset, comprising:
a flexible exhaust tubular member configured to be connected between an exhaust manifold of a combustion engine and a muffler, the flexible exhaust tubular member having an inner diameter; and
two or more distinct rings located on the inner diameter of the flexible exhaust tubular member, each of the rings having surfaces positioned substantially perpendicular to a flow of cooling water and exhaust gases emitted from a combustion engine, each of the rings having an outer diameter the same as the inner diameter of the flexible exhaust tubular member and a generally circular inner surface having a substantially uniform inner diameter that defines an opening therethrough, wherein the opening is unobstructed, each of the inner surfaces of the rings being exposed directly to an exhaust gas passageway in the exhaust tubular member, the rings constricting the passageway which causes mixing of cooling water with exhaust gases to reduce noise generated by the combustion engine.

12. The exhaust apparatus of claim 11, wherein the two or more rings are evenly spaced about 4½ inches apart from each other along a length of the flexible exhaust tubular member.

13. The exhaust apparatus of claim 11, wherein the flexible exhaust tubular member has an outer diameter of about 2 inches.

14. The exhaust apparatus of claim 11, wherein the length of the flexible exhaust tubular member is about 6 feet or less.

15. The exhaust assembly of claim 11, wherein the inner diameter of each of the rings is sized to be 25% to 50% smaller than the inner diameter of the flexible exhaust tubular member to provide constriction of the exhaust gas passageway.

16. An exhaust apparatus for a marine genset, comprising:
a rigid tubular member having a first end connectable to an exhaust outlet of a combustion engine, the tubular member including an inner diameter, the inner diameter having at least two distinct rings mounted thereto, each of the rings having surfaces positioned substantially perpendicular to a flow of cooling water and exhaust gases emitted from a combustion engine, each of the rings having an outer diameter the same as the inner diameter of the tubular member and a substantially uniform inner diameter that defines an opening therethrough, wherein the opening is unobstructed, each of the rings having a generally circular inner surface being exposed directly to an exhaust gas passageway in the tubular member, the rings constricting the passageway which causes mixing of cooling water with exhaust gases to reduce noise generated by the combustion engine.

17. The exhaust apparatus of claim 16, wherein the tubular member is a rigid metal pipe.

18. The exhaust apparatus of claim 16, wherein a second end of the tubular member is connectable to a flexible marine exhaust hose.

19. The exhaust apparatus of claim 16, wherein the tubular member includes a first ring mounted to the first end of the tubular member and a second ring mounted to a second end of the tubular member, the first ring and the second ring being 4 to 5 inches apart.

20. The exhaust apparatus of claim 16, wherein the tubular member and the rings are stainless steel.

21. The exhaust assembly of claim 16, wherein each ring is in a plane perpendicular to the length of the tubular member.

22. The exhaust assembly of claim 16, wherein the inner diameter of each of the rings is sized to be 25% to 50% smaller than the inner diameter of the rigid tubular member to provide constriction of the exhaust gas passageway.

23. An exhaust system for a marine genset, the exhaust assembly comprising:
a combustion engine having an exhaust to emit cooling water and exhaust gases;
a muffler;
a water separator;
an exhaust hose connecting the exhaust and the muffler; and
an exhaust tubular member positioned between the exhaust and the exhaust hose, the tubular member having an inner diameter and two or more distinct rings located on the inner diameter; each of the rings having surfaces positioned substantially perpendicular to a flow of the cooling water and exhaust, each of the rings having an outer diameter the same as the inner diameter of the tubular member and a substantially uniform inner diameter that defines an opening therethrough, wherein the opening is unobstructed, each of the rings having a generally circular inner surface positioned to face an exhaust gas passageway in the tubular member, the rings constricting the passageway which causes mixing of the cooling water with the exhaust gases to reduce noise generated by the combustion engine.

24. The exhaust system of claim 23, wherein the exhaust tubular member includes a first ring mounted to a first end of the tubular member and a second ring mounted to a second end opposite to the first end of the tubular member, the first ring and the second ring being 4 to 5 inches apart.

25. The exhaust system of claim 23, wherein each ring is in a plane perpendicular to the length of the tubular member.

26. The exhaust assembly of claim 23, wherein the inner diameter of each of the rings is sized to be 25% to 50% smaller than the inner diameter of the tubular member to provide constriction of the exhaust gas passageway.

\* \* \* \* \*